United States Patent Office 2,822,374
Patented Feb. 4, 1958

2,822,374

PREPARATION OF ORGANIC PHOSPHOROTHIOIC HALIDES

Paul W. Vogel, Warrensville Heights, Ohio, assignor to The Lubrizol Corporation, Wickliffe, Ohio, a corporation of Ohio No Drawing. Application January 20, 1954
Serial No. 405,250

7 Claims. (Cl. 260—461)

This invention relates to a method for making phosphorothioic halides (acid halides of thiophosphoric acid esters).

The term "organic phosphorothioic acids," as used in the specification and appended claims, includes those acidic organic esters of phosphorodithioic acid, phosphorotrithioic acid, and phosphorotetrathioic acid which contain one sulfur atom bonded to a phosphorus atom by a semi-polar bond and one sulfur atom bonded both to a phosphorus atom and a hydrogen atom. The terms also include mixtures of different organic phosphorothioic acids.

The phosphorothioic halides have gained wide interest in recent chemistry by virtue of their role as intermediates in the syntheses of insecticides. O,O-di-ethyl phosphorothioic chloride is particularly interesting in view of its importance as an intermediate in the preparation of Parathion, a trade name for the product p-nitrophenyl diethylphosphorothionate, which is the principal product of the reaction of O,O-di-ethyl phosphorothioic chloride with sodium p-nitrophenate.

It is an object of this invention to provide a method for the preparation of acid chlorides of organic phosphorothioic acids, and especially for the preparation of O,O-diethyl phosphorothioic chloride. A secondary object is the preparation of certain organic sulfur- and nitrogen-containing compounds including thioamides and dithiocarbamates. Still a further object is the conjoint preparation of such organic sulfur- and nitrogen-containing compounds and of phosphorothioic chlorides. A still further object is the preparation of compounds which may be used as intermediates in the syntheses of insecticides. Other objects will be apparent from the following description.

Broadly stated, this invention relates to the process which comprises reacting a hydrogen halide with organic phosphorothioic acids in the presence of at least one nitrogen-bearing hydrogen sulfide acceptor in which a multiple bond exists between adjacent N and C atoms. Examples of the latter are organic nitrogen-bearing hydrogen sulfide acceptors selected from the class consisting of nitriles, organic thiocyanates and aliphatic isothiocyanates.

ORGANIC PHOSPHOROTHIOIC ACIDS EMPLOYED IN THE PROCESS

The organic phosphorothioic acids which may be used in the process of this invention can be defined by the structural formula:

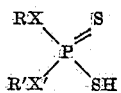

wherein X and X' are the same or different elements selected from the class consisting of oxygen and sulfur, preferably those compounds in which X and X' are both oxygen; and R and R' are the same or different organic radicals, preferably hydrocarbon radicals of from 1 to 30 carbon atoms, desirably non-benzenoid hydrocarbon radicals, including the alkyl and cycloalkyl radicals, and most desirably alkyl radicals. Such organic radicals, R and R', are illustrated by the specific examples in the following table:

Table 1

(1) Aliphatic radicals, for example:
Alkyl radicles, e. g.:
Methyl
Ethyl
Propyl (n- and iso-)
Butyl (n-, sec-, iso-, and tert-)
Amyl (n-, sec-, iso-, and tert-)
Hexyl radicles, e. g.:
n-Hexyl
Sec-hexyl
2,2-dimethyl-3-butyl
2,2-dimethyl-4-butyl
2,3-dimethyl-2-butyl
2-methyl-1-pentyl
2-methyl-2-pentyl
3-methyl-1-pentyl
3-methyl-2-pentyl, etc.
Heptyl radicles, e. g.:
n-Heptyl
Sec-heptyl
2,3-dimethyl-3-pentyl
2,4-dimethyl-2-pentyl
2,4-dimethyl-3-pentyl
2,2,3-trimethyl-3-butyl
3-ethyl-2-pentyl
2-methyl-2-hexyl, etc.
Octyl radicles, e. g.:
n-Octyl
2-ethyl-hexyl
Diisobutyl
Capryl
Nonyl radicles, e. g.:
Di-iso-butyl-carbinyl
n-Nonyl
Decyl radicles, e. g.: n-decyl
Dodecyl radicles, e. g.: lauryl
Tetradecyl radicles, e. g.: myristyl
Hexadecyl radicles, e. g.: cetyl
Octadecyl radicles, e. g.: stearyl
Alkyl radicles having the formula $C_nH_{2n+1}$ where $n$ is an integer from 18 to 38 inclusive e. g. those derived from paraffin wax, mineral oils and petrolatum
Alkenyl radicles, e. g.:
Vinyl
Propenyl radicles, e. g.:
Allyl
Iso-propenyl
Butenyl radicles, e. g.:
n-Butenyl-1
n-Butenyl-2
n-Butenyl-3
Iso-butenyl
Pentenyl radicles, e. g.:
n-Pentenyl-1
n-Pentenyl-2
n-Pentenyl-3
Hexenyl radicles, e. g.:
n-Hexenyl-1
n-Hexenyl-2, etc.
4,4-dimethyl-butenyl-2
3,4-dimethyl-butenyl-1, etc.
Heptenyl radicles, e. g.: n-heptenyl
Octenyl radicles, e. g.:
n-Octenyl
Diisobutenyl
Nonenyl radicles, e. g.: n-nonenyl
Decenyl radicles, e. g.: n-decenyl
Dodecenyl radicles, e. g.:
n-Dodecenyl
Triisobutenyl
Alkenyl radicles having the formula $C_nH_{2n-1}$ where $n$ is an integer from 18 to 38 inclusive e. g. those derived from paraffin wax, mineral oils, and petrolatum (2) Cycloaliphatic radicles, for example:
Cycloalkyl radicles, e. g.:
Cyclopentyl, alkylated-cyclopentyl, cyclohexyl, and alkylated-cyclohexyl radicles, e. g.:
Mono-and poly-methyl-cyclopentyl radicles
Mono and poly-methyl-cyclohexyl radicles
Mono- and poly-ethyl-cyclohexyl radicles
Mono- and poly-iso-propyl-cyclohexyl radicles
Mono- and poly-tert-amyl-cyclohexyl radicles
n-Octyl-cyclohexyl radicles
Diisobutyl-cyclohexyl (i. e., "tert-octyl"-cyclohexyl) radicles
Nonyl-cyclohexyl radicles
Diiso-amyl-cyclohexyl radicles
Lauryl-cyclohexyl radicles
Cetyl-cyclohexyl radicles
Naphthenyl radicles
Hydroabietyl radicles Cycloalkenyl radicles, e. g.:
  Cyclopentenyl, alkylated-cyclopentenyl, cyclohexenyl, and alkylated-cyclohexenyl radicles, e. g.:
    Mono- and poly-methyl-cyclopentenyl radicles
    Mono- and poly-methyl-cyclohexenyl radicles
    Mono- and poly-ethyl-cyclohexenyl radicles
    Mono- and poly-iso-propyl-cyclohexenyl radicles
    Mono- and poly-tert-amyl-cyclohexenyl radicles
    n-Octyl-cyclohexenyl radicles
    Diisobutyl-cyclohexenyl radicles
    Nonyl-cyclohexenyl radicles
    Diiso-amyl-cyclohexenyl radicles
    Lauryl-cyclohexenyl radicles
    Cetyl-cyclohexenyl radicles
  Dehydronaphthenyl radicles
  Abietyl radicles
(3) Aryl- and cycloalkyl-substituted aliphatic radicles, for example:
  (a) Phenyl- and alkyl-phenyl-substituted alkyl radicles, e. g.:
    Benzyl
    Methyl-benzyl
    Capryl-benzyl
    Diisobutyl-benzyl
    Phenyl-ethyl
    Phenyl-propyl
    Phenyl-octadecyl
  (b) Xenyl- and alkyl-xenyl-substituted alkyl radicles, e. g.:
    Xenyl-methyl
    Capryl-xenyl-methyl
    Xenyl-ethyl
    Diisobutyl-xenyl-methyl
  (c) Naphthyl- and alkyl-naphthyl-substituted alkyl radicles, e. g.:
    Naphthyl-methyl
    Tert-amyl-naphthyl-methyl
    Naphthyl-ethyl
    Cetyl-naphthyl-ethyl
  (d) Cyclohexyl- and alkyl-cyclohexyl-substituted alkyl radicles, e. g.:
    Cyclohexyl-ethyl
    Methyl-cyclohexyl-ethyl
    Ethyl-cyclohexyl-ethyl
    Cyclohexyl-propyl
    Tert-amyl-cyclohexyl-butyl
(4) Oxygen containing aliphatic and cycloaliphatic radicles, for example:
  (a) Oxygen-containing aliphatic radicles, e. g.:
    Alkoxy-substituted alkyl radicles, e. g.:
      Propoxy-ethyl radicles, e. g.:
        n-Propoxy-ethyl
        Iso-propoxy-ethyl
      Butoxy-ethyl radicles, e. g.:
        n-Butoxy-ethyl
        Iso-butoxy-ethyl
        Tert-butoxy-ethyl
      Octoxy-ethyl radicles, e. g.:
        n-Octoxy-ethyl
        Diisobutoxy-ethyl
      Di-butoxy-propyl radicles, e. g.:
        2,3-di-n-butoxy-propyl
        3,3-di-iso-butoxy-propyl
      Di-octoxy-propyl radicles, e. g.:
        3,3-di-n-n-octoxy-propyl
        2,3-bis-(diisobutoxy)-propyl
    Cycloalkoxy substituted alkyl radicles, e. g.:
      Cyclohexoxy-methyl
      Cyclohexoxy-ethyl radicles, e. g.:
        Beta-cyclohexoxy-ethyl
        Alpha-cyclohexoxy-ethyl
      Cyclohexoxy-butyl radicles, e. g.:
        2-(cyclohexoxy)-butyl
        2,3-di-cyclohexoxy-butyl
      Methyl-cyclohexoxy-propyl radicles, e. g.:
        2-(o-methyl-cyclohexoxy)-propyl
        2-(p-methyl-cyclohexoxy)-propyl
      Butyl-cyclohexoxy-ethyl radicles, e. g.:
        Beta-(p-tert-butyl-cyclohexoxy)-ethyl
        Alpha-(o-sec-butyl-cyclohexoxy)-ethyl
      Cyclopentoxy-ethyl radicles, e. g.:
        Alpha-cyclopentoxy-ethyl
        Beta-cyclopentoxy-ethyl
      Propyl-cyclopentoxy-methyl radicles, e. g.:
        Iso-propyl-cyclopentoxy-methyl radicles
        n-propyl-cyclopentoxy-methyl radicles
    Alkenoxy-substituted alkyl radicles, e. g.:
      Propenoxy-ethyl radicles, e. g.:
        Allyloxy-ethyl
        Iso-propenoxy-ethyl
      Octenoxy-ethyl radicles, e. g.: diisobutenoxy-ethyl
      Di-octenoxy-propyl radicles, e. g.: 2,3-bis-(di-isobutenoxy)-propyl
    Epoxy-alkyl radicles, e. g.:
      Epoxy-propyl
      Epoxy-butyl radicles, e. g.:
        2,3-epoxy-n-butyl
        3,4-epoxy-n-butyl
    Carboalkoxy-alkyl radicles $$(R-O\overset{O}{\underset{\|}{C}}-R'-),\ e.\ g.:$$
    Carbomethoxy-methyl $$(CH_3-O-\overset{O}{\underset{\|}{C}}-CH_2-)$$
    Carboethoxy-ethyl
    Carbolauroxy-ethyl Aroxy substituted alkyl radicles, for example phenoxy- and alkylphenoxy-substituted alkyl radicles, e. g.:
      Phenoxy-methyl
      Phenoxy-ethyl
      Cetyl-phenoxy-ethyl
      Phenoxy-phenethyl
      Capryl-phenoxy-phenethyl
  (b) Oxygen-containing cycloaliphatic radicles, e. g.:
    Alkoxy-, alkenoxy-, and aroxy-substituted cycloalkyl radicles, e. g.:
      Alkoxy-substituted cyclopentyl radicles, e. g.:
        Mono- and poly-ethoxy-cyclopenxyl
        Octoxy-cyclopentyl radicles, e. g.: diisobutoxy-cyclopentyl
      Alkoxy-substituted cyclohexyl radicles, e. g.:
        Mono- and poly-methoxy-cyclohexyl
        Octoxy-cyclohexyl radicles, e. g.: diisobutoxy-cyclohexyl
      Alkenoxy-substituted cyclopentyl radicles, e. g.:
        Propenoxy-cyclopentyl radicles, e. g.:
          Allyloxy-cyclopentyl
          Iso-propenoxy-cyclopentyl
      Alkenoxy-substituted cyclohexyl radicles, e. g.:
        Vinyloxy-cyclohexyl
        Propenoxy-cyclohexyl radicles, e. g.:
          Allyloxy-cyclohexyl
          Iso-propenoxy-cyclohexyl
        Octenoxy-cyclohexyl radicles, e. g.: diisobutenoxy-cyclohexyl
      Aroxy-substituted cyclopentyl radicles, e. g.:
        Phenoxy-cyclopentyl
        Poly-phenoxy-cyclopentyl radicles, e. g.:
          Di-phenoxy-cyclopentyl radicles
          Tetra-phenoxy-cyclopentyl radicles
        Ethyl-phenoxy-cyclopentyl radicles, e. g.:
          o-Ethyl-phenoxy-cyclopentyl
          p-Ethyl-phenoxy-cyclopentyl
        Naphthoxy-cyclopentyl
        Amyl-naphthoxy-cyclopentyl radicles, e. g.:
          Tert-amyl - alpha - naphthoxy - cyclopentyl radicles
          n-Amyl-beta - naphthoxy - cyclopentyl radicles
      Aroxy-substituted cyclohexyl radicles, e. g.:
        Phenoxy-cyclohexyl
        Poly-phenoxy-cyclohexyl radicles, e. g.:
          Di-phenoxy-cyclohexyl radicles
          Tri-phenoxy-cyclohexyl radicles
        Butyl-phenoxy-cyclohexyl radicles, e. g.:
          p-Tert-butyl-phenoxy-cyclohexyl
          n-Butyl-phenoxy-cyclohexyl
        Naphthoxy-cyclohexyl radicles, e. g.:
          Alpha-naphthoxy-cyclohexyl
          Beta-naphthoxy-cyclohexyl
        Methyl-naphthoxy-cyclohexyl radicles
        Propyl-naphthoxy-cyclohexyl radicles, e. g.:
          Iso-propyl - alpha - naphthoxy - cyclohexyl radicles
          n-Propyl-beta - naphthoxy - cyclohexyl radicles
    Epoxy-cycloalkyl radicles, e. g.:
      Epoxy-cyclopentyl
      Epoxy-cyclohexyl
    Carboalkoxy-cycloalkyl radicles, e. g.:
      Carboethoxy-cyclopentyl,

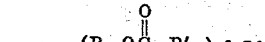

Carbomethoxy-cyclohexyl
      Carbolauroxy-cyclohexyl
(5) Aliphatic and cycloaliphatic radicles containing inorganic elements. (Examples of such inorganic elements are: halogens; metals; metalloids, e. g.: selenium; silicon; sulphur.) Examples of such radicles are:
  (a) Aliphatic radicles containing inorganic elements, for example:
    Alkyl radicles containing halogen, e. g.:
      2-fluoro-ethyl
      2-chloro-ethyl
      2-iodo-ethyl
    Chloro-pentyl radicles, e. g.:
      5-chloro-n-pentyl
      3,5-di-chloro-n-pentyl
    Bromo-octyl radicles, e. g.:
      3-bromo-n-octyl
      3,4-di-bromo-n-octyl
    Alkenyl radicles containing halogen, e. g.:
      Chloro-propenyl radicles, e. g.:
        2-chloro-allyl
        Chloro-iso-propenyl
      Bromo-butenyl radicles, e. g.:
        4-bromo-crotyl
        4,4-di-bromo-crotyl
    Chloro-octenyl radicles, e. g.: mono- and poly-chloro-diisobutenyl
    Alkyl radicles containing metal, e. g.:
      Radicles derived from metal alkoxides, e. g.:

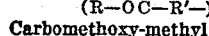

Radicles derived from metal alkylcarboxylates, e. g.:

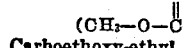
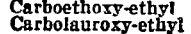

in which M represents one equivalent of a metal. Examples of such metals are:
The alkali metals
The alkaline-earth metals
Cu and Ag
Zn, Cd and Hg
Al, Fe, Co, Ni
Sn, Pb
Sb, Bi
Mn Alkyl radicles containing silicon, e. g.:

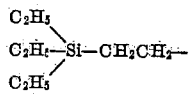

Alkyl radicles containing sulphur, e. g.:

$C_2H_5$—S—$CH_2CH_2$—

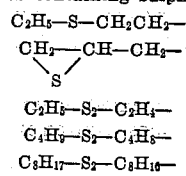

$C_2H_5$—$S_2$—$C_2H_4$—
$C_4H_9$—$S_2$—$C_4H_8$—
$C_8H_{17}$—$S_2$—$C_8H_{16}$—

Alkyl radicles containing selenium, e. g.:
$C_2H_5$—Se—$CH_2CH_2$—
$C_4H_9$—Se—$C_4H_8$—

(b) Cycloaliphatic radicles containing inorganic elements, for example:
  Cycloalkyl- and alkylated-cycloalkyl radicles containing halogen, e. g.:
    Mono- and poly-chloro-cyclopentyl
    Mono- and poly-chloro methyl-cyclohexyl
    4-tert-amyl-2,6-di-bromo-cyclohexyl
    4-capryl-2-fluoro-cyclohexyl
    4-diisobutyl-2-iodo-cyclohexyl
  Cycloalkenyl- and alkylated-cycloalkenyl radicles containing halogen, e. g.:
    Mono- and poly-chloro-cyclopentenyl
    Mono- and poly-chloro-methyl-cyclohexenyl
    4-tert-butyl-2-bromo-cyclohexenyl
    4-capryl-2-fluoro-cyclohexenyl
    4-diisobutyl-2-iodo-cyclohexenyl
  Cycloalkenyl- and alkylated-cycloalkenyl radicles containing halogen, e. g.:
    Mono- and poly-chloro-cyclopentenyl
    Mono- and poly-chloro-methyl-cyclohexenyl
    4-tert-butyl-2-bromo-cyclohexenyl
    4-capryl-2-fluoro-cyclohexenyl
    4-diisobutyl-2-iodo-cylohexenyl
  Cycloalkyl radicles containing metal, e. g.:
    Radicles derived from metal cycloalkoxides, e. g.:

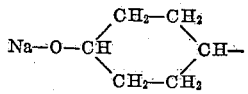

Radicles obtained on the removal of a hydrogen atom from the cycloaliphatic nucleus of, e. g.:
      Potassium cycloalkoxide of petroleum naphthenyl alcohol
      Lithium cycloalkoxide of hydroabietyl alcohol
    Radicles derived from metal cycloalkylcarboxylates, e. g.:

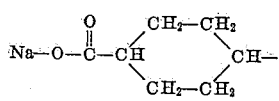

Radicles obtained on the removal of a hydrogen atom from the cycloaliphatic nucleus of, e. g.:
      Sodium salt of petroleum naphthenic acids
      Lithium salt of hydroabietic acid
  Cycloalkyl radicles containing silicon, e. g.:

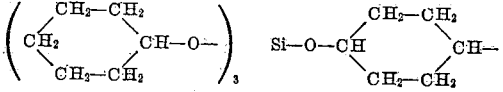

Cycloalkyl radicles containing sulphur, e. g.:

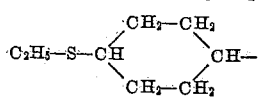

radicle obtained on the removal of a hydrogen atom from the cycloaliphatic nucleus of amyl thiol-naphthenate
  Cycloalkyl radicles containing selenium, e. g.:

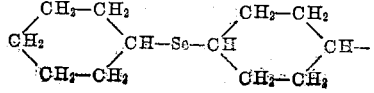

(6) Aromatic radicles, including aryl radicles, unsubstituted and substituted, including mono- and poly-alkylated and cyclo-alkylated aromatic nuclei, e. g.:
  Phenyl
  Cresyl
  Xylyl
  Mesityl
  Ethyl-phenyl
  Di-ethyl-phenyl
  Iso-propyl-phenyl
  n-Propyl-phenyl
  Tert-butyl-phenyl
  Di-tert-butyl-phenyl
  Iso-butyl-phenyl
  n-Butyl-phenyl
  Tert-amyl-phenyl
  Cyclohexyl-phenyl
  Methyl-cyclohexyl-phenyl
  Capryl-phenyl
  Diisobutyl-phenyl
  Lauryl-phenyl
  Cetyl-phenyl
  Paraffin wax-substituted phenyl
  Nitro-phenyl
  Mono-chloro-phenyl
  Poly-chloro-phenyl, e. g.: dichloro-phenyl, trichloro-phenyl
  Hydroxy phenyl
  Acetyl-phenyl
  Carbolauroxy-phenyl
  Lauroxy-phenyl
  Xenyl
  Mono- and poly-chloro-xenyl
  Capryl-xenyl
  Phenoxy-phenyl
  Thiophenoxy-phenyl
  Diisobutyl-phenoxy-phenyl
  Naphthyl
  Mono- and poly-chloro-naphthyl
  Cetyl-naphthyl
  Anthracyl
  Mono- and poly-chloranthracyl
  Phenanthryl
  Mono- and poly-chloro-phenanthryl
  Lauryl-phenanthryl
  MO—Ph—R—, where M is one equivalent of a metal (e. g. those listed under (5) above), Ph is the benzene ring, and R is a divalent aliphatic radicle, e. g.:
    Alkylene radicles, e. g.:
      Methylene
      Ethylene
      Propylene
      etc.
  Aromatic radicles having more than one kind of substituent, e. g.:
    Alkyl-hydroxy-aryl radicles, e. g.:
      Mono-methyl-hydroxy-phenyl radicles
      Poly-methyl-hydroxy-phenyl radicles, e. g.:
        Di-methyl-hydroxy-phenyl radicles
        Tri-methyl-hydroxy-phenyl radicles
      Mono-ethyl-hydroxy-phenyl radicles
      Poly-ethyl-hydroxy-phenyl radicles, e. g.:
        Di-ethyl-hydroxy-phenyl radicles
        Tri-ethyl-hydroxy-phenyl radicles
      Mono-butyl-hydroxy-phenyl radicles, e. g.:
        Tert-butyl-hydroxy-phenyl radicles
        Sec-butyl-hydroxy-phenyl radicles
      Poly-butyl-hydroxy-phenyl radicles, e. g.: di-tert-butyl-hydroxy-phenyl radicles
      Mono-methyl-dihydroxy-phenyl radicles
      Poly-methyl-dihydroxy-phenyl radicles, e. g.:
        Di-methyl-dihydroxy-phenyl radicles
        Tri-methyl-dihydroxy-phenyl radicles
      Mono-propyl-hydroxy-naphthyl radicles, e. g.:
        mono-isopropyl-alpha-hydroxy naphthyl radicles
      Poly-propyl-hydroxy-naphthyl radicles, e. g.:
        di-n-propyl-beta-hydroxy-naphthyl radicles
    Alkyl-chloro-aryl radicles, e. g.:
      Methyl-monochloro-phenyl radicles
      Methyl-polychloro-phenyl radicles, e. g.:
        Methyl-dichloro-phenyl radicles
        Methyl-trichloro-phenyl radicles
      Ethyl-monochloro-anthracyl radicles, e. g.:
        Ethyl-monochloro-alpha-anthracyl radicles
        Triethyl - monochloro-beta - anthracyl radicles
      Ethyl-polychloro-anthracyl radicles, e. g.:
        Ethyl-dichloro-alpha-anthracyl radicles
        Diethyl-trichloro-beta-anthracyl radicles
    Alkyl-nitro-aryl radicles, e. g.:
      Methyl-nitro-phenyl radicles
      Dimethyl-nitro-phenyl radicles
      Ethyl-dinitro-phenyl radicles
      Butyl-nitro-naphthyl radicles, e. g.:
        Tert-butyl-nitro-naphthyl radicles
        Sec-butyl-dinitro-naphthyl radicles
      Propyl-nitro-phenanthryl radicles, e. g.:
        Iso-propyl-dinitro-phenanthryl radicles
        Di-n-propyl-dinitro-phenanthryl radicles As set forth hereinbefore, the term "organic phosphorothioic acids" as used in this specification and the appended claims, includes those acidic organic esters of phosphorodithioic acid, phosphorotrithioic acid, and tetrathiophosphoric acid which contain one sulfur atom which is bonded to a phosphorus atom by a semi-polar bond and one sulfur atom which is bonded both to a phosphorus atom and a hydrogen atom. The term also includes mixtures of different organic phosphorothioic acids. Although all of such organic phosphorothioic acids are included within the scope of my invention, I prefer to employ the phosphorodithioic acid O,O-di-esters, commonly referred to as O,O-di-organo phosphorodithioic acids, because they are cheap and easily available.

THE HYDROGEN HALIDES EMPLOYED IN THE PROCESS

Although, because of its economy, hydrogen chloride is preferred, hydrogen bromide may also be used in the process. Thus the scope of the invention is intended to include hydrogen bromide as well as hydrogen chloride. The hydrogen halide gas may be merely bubbled below the surface of a liquid mixture of organic phosphorodithioic acid and hydrogen sulfide acceptor while maintaining the mixture at a temperature suitable for the reaction to occur.

HDROGEN SULFIDE ACCEPTORS EMPLOYED IN THE PROCESS

The mechanism by which this reaction proceeds is not clearly understood, although the molecular structures of the products indicate that the elements of hydrogen sulfide are removed from a combination of one molecule of organic phosphorothioic acid and one molecule of hydrogen halide, and that these elements of hydrogen sulfide then are accepted into the molecular structure of a third compound. This compound may be regarded then as a "hydrogen sulfide acceptor," and this terminology is used herein to denote such compounds. Compounds which have been found to be efficient hydrogen sulfide acceptors include the hereinbefore mentioned nitriles, organic thiocyanates and aliphatic isothiocyanates. Mixtures of such acceptors may also be used if desired.

Particularly useful hydrogen sulfide acceptors include acetonitrile, acrylonitrile, and benzonitrile; these three are relatively cheap. Additional specific examples of satisfactory hydrogen sulfide acceptors are propionitrile, butyronitrile, benzyl cyanide, ethyl thiocyanate, phenyl thiocyanate, ethyl isothiocyanate, etc. Accordingly to the stoichiometry of the equations below representing the reaction of a hydrogen halide in the presence of a hydrogen sulfide acceptor, the molar ratio of hydrogen sulfide acceptor to phosphorus acid should preferably be at least 1 to 1. Greater amounts of hydrogen sulfide acceptor can be employed without detriment and often with benefit to the reaction. Lesser amounts can be used at the expense of optimum yields. In many instances greater amounts are preferred, especially where the hydrogen sulfide acceptor is volatile, as acetonitrile.

PROCEDURE

The course of the reaction which produces the organic phosphorothioic halides according to this invention is more fully depicted by the following equations:

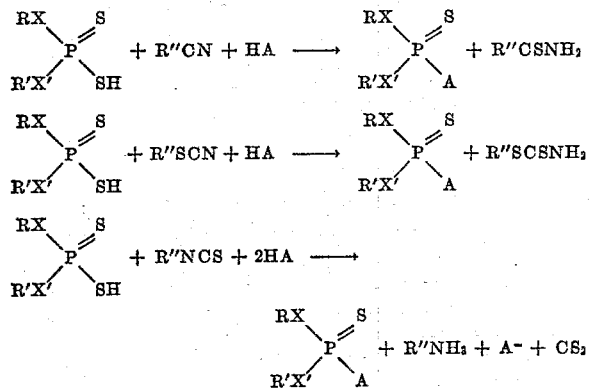

in which R and R' are the same or different organic radicals as described hereinbefore, R" may be the same or different from either R, R', X and X' may be oxygen or sulfur and A represents one of the halogens, chlorine, and bromine.

In the ordinary practice of this invention the invention may be carried out in any of three different ways:

(1) Hydrogen halide gas is bubbled into an anhydrous solution of the organic phosphorothioic acid at the reflux temperature and the hydrogen sulfide acceptor is added portionwise.

(2) Hydrogen halide gas is bubbled into an anhydrous solution of the thiophosphoric acid ester and the hydrogen sulfide acceptor at reflux temperature.

(3) Hydrogen halide gas is bubbled into an anhydrous solution of the hydrogen sulfide acceptor at reflux temperature and the thiophosphoric acid ester is added dropwise.

Each of the above methods gives good yields; method No. 2 is usually the most convenient and simplest, so it is preferred.

The use of a solvent in the reaction described herein provides the advantage of better temperature control, particularly if one of the reactants is a solid and insoluble in the other reactant. Inasmuch as alcohols and water tend to interfere with the desired reaction, it is preferred to use a solvent other than alcohols or water, or even such solvents which tend to produce alcohols or water under the conditions of this type of reaction. Examples of such undesirable solvents are the esters of formic acid, which upon hydrolysis yield alcohols. Thus inert solvents are to be preferred, and particularly those inert solvents which will dissolve hydrogen halides readily. Ethyl ether, dioxane, petroleum ether, chloroform, carbon tetrachloride, tetrahydrofuran, methylene chloride, benzene and carbon disulfide are included among those solvents which are useful for this type of reaction. It is not to be inferred that all inert solvents are equivalent in efficacy in all cases, but that under certain conditions some inert solvents are more desirable than others. Neither is it to be inferred that a solvent, however advantageous its properties may be, is essential to the success of the reaction in all cases.

Generally the reaction is complete within a period of from two to six hours, although this is dependent, of course, largely upon the rate at which the hydrogen halide is added to the reaction mixture. But in the case wherein hydrogen chloride is the hydrogen halide used, if the rate at which hydrogen chloride is introduced is moderately vigorous, i. e. in the vicinity of 200 cubic centimeters per minute for a reaction mixture whose volume is approximately 200 milliliters, then any other limiting factors do not usually prolong the reaction beyond six hours. If the reaction is allowed to continue beyond six hours, no harmful effects are observed, however. As the reaction which occurs involves one mole of the organic phosphorothioic acid and one mole of the hydrogen sulfide acceptor, it is desirable, for reasons of economy in carrying out the process, that the starting materials be used in approximately these relative amounts, or with a slight excess of that reactant which is cheaper on a molar basis.

The type of reaction which is the subject of this invention will take place at ordinary temperatures. The speed of the reaction is promoted by heat, however, so the temperature usually employed is approximately that of the boiling point of the refluxing solvent, although it may be higher under conditions of superatmospheric pressure. The process of this invention can be carried out in the broad temperature range of about 10° C. to about 300° C.

The following examples illustrate further the details of the invention:

Example 1

A solution of 37.2 grams (0.2 mole) of O,O-diethyl phosphorodithioic acid and 20.6 grams (0.2 mole) of benzonitrile in 100 milliliters of ethyl ether was heated at reflux temperature for four hours, throughout which time a vigorous stream of anhydrous hydrogen chloride gas was passed into the solution. The ethyl ether and residual hydrogen chloride were removed by evaporation, and O,O-diethyl phosphorothioic chloride was extracted from the residue with low-boiling petroleum ether. The petroleum ether extract was washed successively with 100-milliliter portions of 5 percent aqueous sodium carbonate solution and water, then concentrated to a liquid residue which was purified by distillation under diminished pressure to yield 28.2 grams (74.8 percent of the theory) of O,O-diethyl phosphorothioic chloride. The petroleum ether-insoluble fraction was crystallized from hot benzene, yielding 23.8 grams (86.5 percent of the theory) of thiobenzamide.

Example 2

A solution of 93.0 grams (0.5 mole) of O,O-diethyl phosphorodithioic acid and 20.5 grams (0.5 mole) of acetonitrile in 200 milliliters of ethyl ether was heated at reflux temperature for four hours, throughout which time a vigorous stream of anhydrous hydrogen chloride gas was led into the solution. The product mixture contained a solid, which was collected on a filter and which constituted a yield of 19.0 grams (51 percent of the theory) of thioacetamide. The ether-soluble fraction was washed successively with 100-milliliter portions of 5 percent aqueous sodium carbonate solution and water, then concentrated and the liquid residue was purified by distillation at reduced pressure to yield 70.0 grams (74 percent of the theory) of O,O-diethyl phosphorothioic chloride.

Example 3

A solution of 37.2 grams (0.2 mole) of O,O-diethyl phosphorodithioic acid and 27.0 grams (0.2 mole) of phenyl thiocyanate in 100-milliliters of low-boiling (30–60° C.) petroleum ether was heated at reflux temperature for four hours throughout which time a vigorous stream of anhydrous hydrogen chloride was led into the solution. The product mixture was allowed to cool, and then was filtered yielding 29.6 grams (87.6 percent of the theory) of phenyl dithiocarbamate. The filtrate was washed successively with 100-milliliter portions of 5 percent aqueous sodium carbonate solution and water, then concentrated and the liquid residue was purified by distillation at reduced pressure to yield 30.2 grams (80.1 percent of the theory) of O,O-diethyl phosphorothioic chloride.

Example 4

A solution of 37.2 grams (0.2 mole) of O,O-diethyl phosphorodithioic acid and 17.4 grams (0.2 mole) of ethyl thiocyanate in 100-milliliters of ethyl ether was heated at reflux temperature for two hours throughout which time a vigorous stream of anhydrous hydrogen chloride gas was led into the solution. The product mixture was allowed to cool and was diluted with 200 milliliters of low-boiling (30–60° C.) petroleum ether. This mixture was stirred well, then filtered. The white solid constituted a yield of 19.8 grams (81.8 percent of the theory) of ethyl dithiocarbamate. The filtrate obtained from the above filtration was washed successively with 100-milliliter portions of 5 percent aqueous sodium carbonate solution and water, then concentrated. The liquid residue was distilled under diminished pressure to yield 30.8 grams (81.7 percent of the theory) of O,O-diethyl phosphorothioic chloride.

Example 5

A solution of 37.2 grams (0.2 mole) of O,O-diethyl phosphorodithioic acid and 17.4 grams (0.2 mole) of ethyl isothiocyanate in 100 milliliters of dioxane was heated at reflux temperature for six hours throughout which time a vigorous stream of hydrogen chloride was led into the solution. The cooled product mixture was diluted with 200 milliliters of ethyl ether and the resulting mixture was filtered. The white solid, ethylamine hydrochloride, weighed 10.0 grams (70.0 percent of theory). The ether-dioxane filtrate was washed successively with 100-milliliter portions of 5 percent aqueous sodium carbonate solution and water, then concentrated. The liquid residue was purified by distillation under diminished pressure, yielding 24.7 grams (65.5 percent of the theory) of O,O-diethyl phosphorothioic chloride.

Example 6

The procedure outlined in Example 3 was followed using 42.8 grams of O,O-diisopropyl phosphorodithioic acid instead of 37.2 grams of O,O-diethyl phosphorodithioic acid. The yields of phenyl dithiocarbamate and O,O-diisopropyl phosphorothioic chloride were 28.1 grams (83.1 percent of the theory) and 38.0 grams (88.8 percent of the theory) respectively.

O,O-diethyl phosphorothioic chloride is a colorless liquid with a stale, musty, disagreeable odor. It distills without decomposition at 80° C./10 mm. and at 25°/0.1 mm. The dithiocarbamates are white solids which may be purified by crystallization from benzene. The thioamides likewise are white solids and these may be purified by crystallization either from benzene, carbon tetrachloride or water depending upon the size and nature of the radicle attached to the thioamide group.

Having thus described my invention by furnishing specific examples thereof, no undue limitations or restrictions should be placed on the scope of my invention except to the extent as defined in the appended claims.

Other modes of applying the principle of the invention may be employed, change being made as regards the details described, provided the features stated in any of the following claims or the equivalent of such be employed.

I therefore particularly point out and distinctly claim as my invention:

1. The method of preparing phosphorothioic halides which comprises reacting a hydrogen halide selected from the class consisting of hydrogen chloride and hydrogen bromide with a phosphorodithioic acid having the structural formula

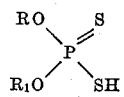

in which R and $R_1$ are lower alkyl radicals, in the presence of a hydrogen sulfide acceptor selected from the class consisting of $R_2CN$, $R_3SCN$ and $R_4NCS$ where $R_2$ and $R_3$ are selected from the class consisting of lower alkyl and phenyl radicals and $R_4$ is a lower alkyl radical.

2. The method of claim 1 characterized further in that the hydrogen halide is hydrogen chloride.

3. The method of claim 1 characterized further in that the hydrogen sulfide acceptor is a nitrile having the structural formula $R_2CN$ in which $R_2$ is a lower alkyl radical.

4. The method of claim 1 characterized further in that the hydrogen sulfide acceptor is phenyl thiocyanate.

5. The method of claim 1 characterized further in that the hydrogen sulfide acceptor is a lower alkyl isothiocyanate.

6. The method of preparing phosphorothioic chlorides which comprises reacting hydrogen chloride with a phosphorodithioic acid having the structural formula

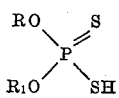

in which R and $R_1$ are lower alkyl radicals, in the presence of about 1 mole of a hydrogen sulfide acceptor per mole of phosphorodithioic acid, said hydrogen sulfide acceptor selected from the class consisting of $R_2CN$, $R_3SCN$ and $R_4NCS$ in which $R_2$ and $R_3$ are selected from the class consisting of lower alkyl and phenyl radicals and $R_4$ is a lower alkyl radical.

7. The method of claim 6 characterized further in that the hydrogen sulfide acceptor is a nitrile having the structural formula $R_2CN$ in which $R_2$ is a lower alkyl radical.

References Cited in the file of this patent

FOREIGN PATENTS 486,848   Canada _____ Sept. 30, 1952

OTHER REFERENCES

Henecka: Methods of Organic Chemistry (in German), by Houben-Weyl, 4th ed., No. III, page 672 (1953).